(12) United States Patent
Nakahara

(10) Patent No.: US 12,192,268 B2
(45) Date of Patent: Jan. 7, 2025

(54) INFORMATION PROCESSING APPARATUS AND METHOD FOR INFORMATION PROCESSING SYSTEM

(71) Applicant: CANON KABUSHIKI KAISHA, Tokyo (JP)

(72) Inventor: Hidetaka Nakahara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 123 days.

(21) Appl. No.: 17/878,144

(22) Filed: Aug. 1, 2022

(65) Prior Publication Data

US 2023/0065096 A1  Mar. 2, 2023

(30) Foreign Application Priority Data

Aug. 27, 2021 (JP) ................ 2021-139105

(51) Int. Cl.
*H04L 67/10* (2022.01)

(52) U.S. Cl.
CPC .................... *H04L 67/10* (2013.01)

(58) Field of Classification Search
CPC ....................................... H04L 67/10
USPC .......................................... 709/219
See application file for complete search history.

(56) References Cited

U.S. PATENT DOCUMENTS

| | | | |
|---|---|---|---|
| 2013/0227085 A1* | 8/2013 | Choi | H04L 67/1095 |
| | | | 709/219 |
| 2019/0058707 A1* | 2/2019 | Chung | H04L 63/102 |
| 2020/0133738 A1* | 4/2020 | Junior | G06F 9/5077 |
| 2021/0191668 A1* | 6/2021 | Saito | G06F 16/16 |
| 2022/0286456 A1* | 9/2022 | Sharma | H04L 9/0894 |
| 2023/0179574 A1* | 6/2023 | Toy | H04L 63/0272 |
| | | | 709/219 |

FOREIGN PATENT DOCUMENTS

JP   2020087006 A   6/2020

OTHER PUBLICATIONS

Office Action issued in Great Britain Appln. No. 2212247.7 mailed on Feb. 13, 2023.

* cited by examiner

*Primary Examiner* — Cheikh T Ndiaye
*Assistant Examiner* — Ayele F Woldemariam
(74) *Attorney, Agent, or Firm* — ROSSI, KIMMS & McDOWELL LLP

(57) ABSTRACT

An information processing apparatus is provided with a first connection unit configured to perform connection to a first cloud service; a second connection unit configured to perform connection to a second cloud service; and a connection support unit configured to support an initial connection to the second cloud service, which is performed after the connection to the first cloud service has been established. The first connection unit receives settings information including an access token, and a command to start the connection to the second cloud service from the first cloud service, which is already connected, before the initial connection to the second cloud service. The connection support unit activates the second connection unit in response to the command from the first cloud service via the first connection unit. The second connection unit executes initial connection to the second cloud service in response to the command using the settings information without receiving an authentication.

6 Claims, 11 Drawing Sheets

INFORMATION PROCESSING APPARATUS AND METHOD FOR INFORMATION PROCESSING SYSTEM

BACKGROUND OF THE INVENTION

Field of the Invention

The present invention relates to an information processing apparatus and a method for an information processing system.

Description of the Related Art

In order to, for example, improve the management and maintainability of information processing apparatuses such as image forming devices and the like, connecting an information processing apparatus to a cloud service has been conventionally performed. For example, services that receive notifications for each type of event that occurs in an information processing apparatus and monitor errors or the like, and services that perform billing and maintenance by periodically obtaining the state of counters and consumable products are examples of this type of cloud service. In addition, other examples of this type of service are services that update firmware and client-installed applications using commands from the cloud service, services that remotely control the settings of the information processing apparatus, and the like. It is possible to create greater efficiency in the management of an information processing apparatus by using a plurality of cloud services.

In addition, it is common for this type of information processing apparatus to be in a network environment that is protected by a company or organization's firewall, and it is difficult to operate the modules of the information processing apparatus using commands from the cloud service. Due to this, at the time of the initial connection to a cloud service, the process for connecting to the cloud service must be started on the information processing apparatus side. That is, in the case in which a new cloud service will be used, it is necessary to manually activate the installed client module that corresponds to the cloud service for each information processing apparatus. For example, in Japanese Unexamined Patent Application, First Publication No. 2020-87006, a system for supporting the connection of information processing apparatuses within an intranet network to cloud services in which an intermediary device is installed within the intranet network is provided.

However, in Japanese Unexamined Patent Application, First Publication No. 2020-87006, it is necessary to install multiple devices that correspond to intermediary devices in order to connect one information processing apparatus to a plurality of cloud services, which is not practical. In addition, in the case in which the client would like to use a plurality of cloud services, it is further necessary to perform this process multiple times. In particular, in an information processing apparatus for which the connection to a cloud service has already been completed, performing the connection processing again in order to connect the information processing apparatus to another cloud service is not efficient.

SUMMARY OF THE INVENTION

One embodiment of the present invention is an information processing apparatus which is able to use a plurality of cloud services provided on a network, the information processing apparatus comprising: a memory storing instructions; and a processor executing the instructions causing the information processing apparatus to: perform connection to a first cloud service, serving as a first connection processing; perform connection to a second cloud service differing from the first cloud service, serving as a second connection processing; and support an initial connection to the second cloud service, which is performed after the connection to the first cloud service has been established, serving as a connection support processing, wherein during the first connection processing, before the initial connection to the second cloud service, settings information including an access token, and a command to start the connection to the second cloud service is received from the first cloud service, which is already connected, during the connection support processing, the second connection processing is activated in response to the command from the first cloud service via the first connection processing, and during the second connection processing, the initial connection to the second cloud service is executed in response to the command using the settings information without receiving an authentication input.

Further features of the present invention will become apparent from the following description of embodiments with reference to the attached drawings.

DETAILED DESCRIPTION OF THE INVENTION

Below, forms for implementing the invention of the present application will be explained with reference to the attached drawings and the like. However, the following embodiments do not limit the inventions according to the claims, and all of the characteristics that are explained in the following embodiments are not necessarily necessary elements of the present invention. Each of the embodiments of the present invention described below can be implemented solely or as a combination of a plurality of the embodiments or features thereof where necessary or where the combination of elements or features from individual embodiments in a single embodiment is beneficial.

First Embodiment

Figure 1:
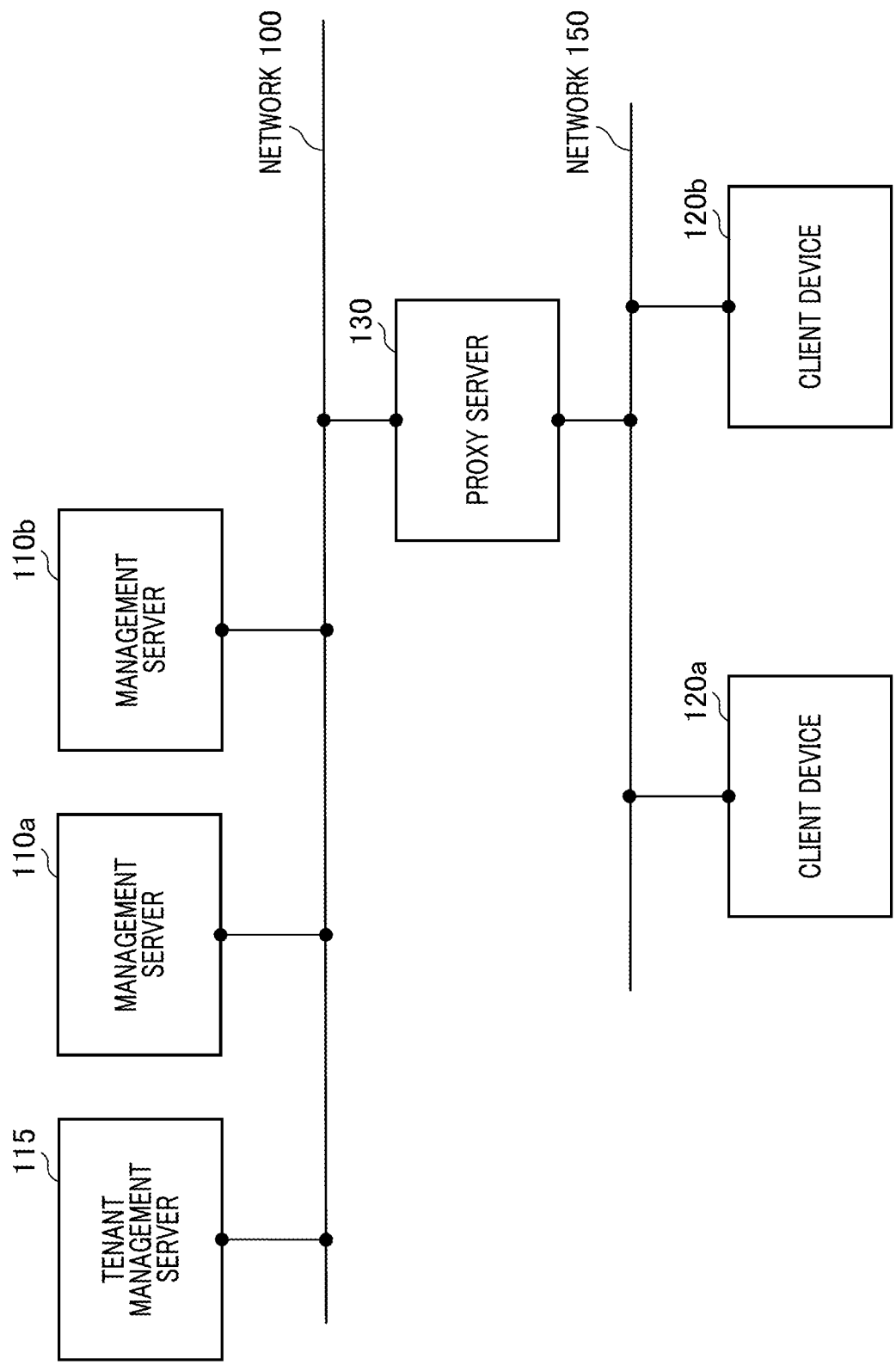
FIG. 1 is a diagram showing an example of a configuration of an information processing system in a First Embodiment.

FIG. 1 is a diagram showing an example of a configuration of an information processing system in the First Embodiment. The information processing system includes a network 100 and a network 150 that are connected via a proxy server 130.

The network 100 is a network implemented by an internet connection, and connects a plurality of management servers 110a and 110b, a tenant management server 115, and a proxy server 130 to each other. The management servers 110a and 110b are both server devices for managing and operating different network services (cloud services). The management servers 110a and 110b are both configured by general information processing apparatuses (computers or the like) that are equipped with each function such as data storage, information processing calculation, and network communication. Alternatively, the management servers 110a and 110b may also be realized by cloud computing having functions that are equivalent to those of an information processing apparatus.

In addition, in the following explanation, when explaining matters that are shared by the management servers 110a and 110b, they will be referred to as the management server 110. Note that the number of management servers that are connected to the network 100 is not limited to two, and there may be three or more.

The tenant management server 115 is a server apparatus for managing client device and customer information. The management servers 110a and 110b, which provide each of the network services, provide the network services by sharing the information that the tenant management server 115 has.

The network 150 is a network implemented by an intranet connection. The network 150 is connected to the external network 100 via the proxy server 130, which is installed in order to increase intranet security. In addition, in addition to the proxy server 130, client devices 120a and 120b are connected to the network 150. In addition, each of the management servers 110a and 110b and the client devices 120a and 120b perform the reception and transmission of information via the proxy server 130.

The present embodiment explains a case in which the client devices 120a and 120b are image processing apparatuses (multifunction peripherals) that have multiple types of functions such as, for example, a copy function, a fax function, or the like. The client devices 120a and 120b both have the function of notifying the management servers 110a and 110b of the history of the execution of each type of function, the history of transitioning to and from an energy saving state, the history of transitioning to and from abnormal states such as errors, and the like.

In addition, in the following explanation, when explaining matters that are shared by the client devices 120a and 120b, they will be referred to as the client device 120. The client device 120 is one example of an information processing apparatus that is able to use a plurality of cloud services that are provided on a network. Note that the number of client devices that are connected to the network 150 is not limited to two, and there may be three or more.

Figure 2:
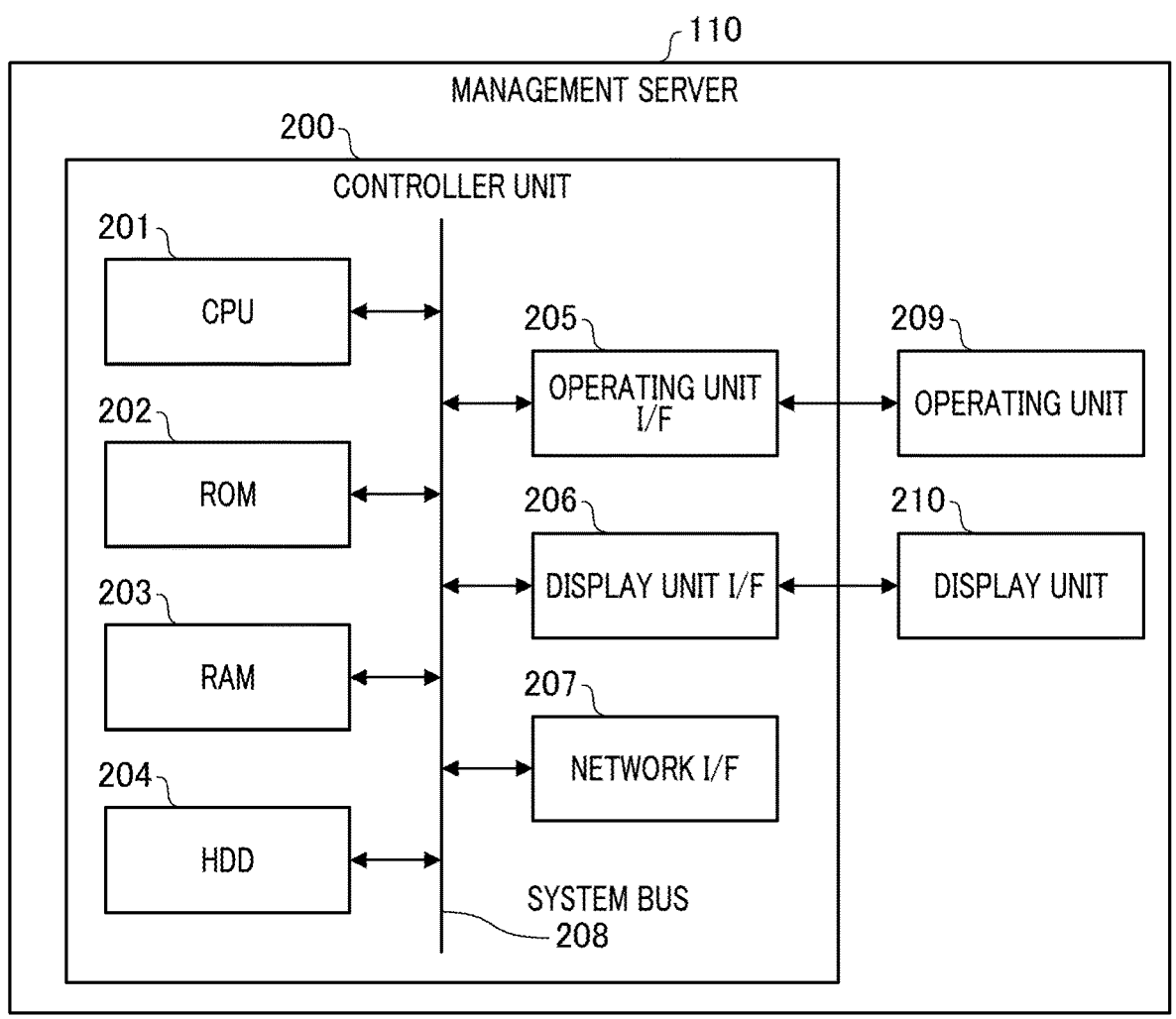
FIG. 2 is a diagram showing an example of a configuration of a management server.

FIG. 2 is a diagram showing an example of a hardware configuration of the management server 110. FIG. 2 shows the case in which the management server 110 is realized as an information processing apparatus such as a regular computer or the like. Note that the hardware configurations of the tenant management server 115 and the proxy server 130 are also the same as that of the management server 110 that is shown in FIG. 2, and therefore, all redundant explanations relating to the tenant management server 115 and the proxy server 130 will be omitted.

As is shown in FIG. 2, the management server 110 includes a controller unit 200, an operating unit 209, and a display unit 210. The operating unit 209 is a device that receives operator inputs to the controller unit 200, and is configured by, for example, a keyboard, a pointing device, or the like. The display unit 210 is a device that outputs an operating screen of the controller unit 220, and is configured by, for example, a display device such as a liquid crystal display or the like.

The controller unit 200 has a CPU 201, a ROM 202, a RAM 203, an HDD 204, an operating unit I/F 205, a display unit I/F 206, and a network I/F 207. Each element of the controller unit 200 is connected to each other via a system bus 208. Note that CPU is an abbreviation of Central Processing Unit, and ROM is an abbreviation of Read Only Memory. RAM is an abbreviation of Random Access Memory, and HDD is an abbreviation of Hard Disk Drive.

The CPU 201 activates an OS (Operating System) using a boot program that is saved on the ROM 202. The CPU 201 executes each type of processing by executing an application program that is saved on the HDD 204 on the OS. The RAM 203 is used as the primary memory for the CPU 201, and a temporary area such as a work area or the like. Note that the HDD 204 saves the above-described application program, and the data for the settings, histories, and the like.

The operating unit I/F 205 is an interface that connects the CPU 201 and the operating unit 209, and sends information that has been input from the operating unit 209 to the CPU 201. The display unit I/F 206 is an interface that connects the CPU 201 and the display unit 210, and outputs the image data to be displayed to the display unit 210. The network I/F 207 is an interface that performs communications with the network 100 conforming to specific communication protocols. The CPU 201 executes the transmission and reception of information between each device on the network 100 via the network I/F 207.

Figure 3:
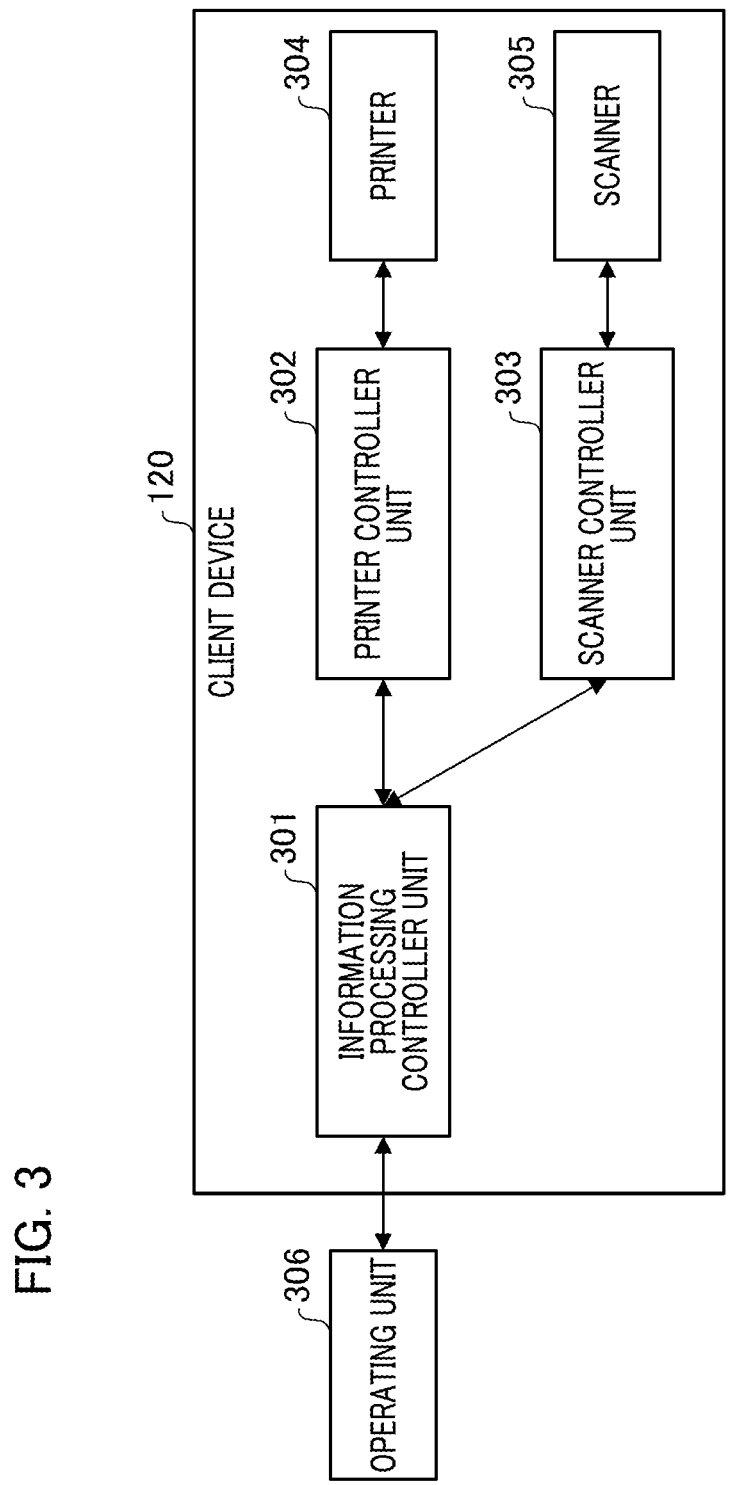
FIG. 3 is a diagram showing an example of a hardware configuration of a client device.

FIG. 3 is a diagram showing an example of a hardware configuration of the client device 120. The client device 120, which is a multifunction peripheral, has an information processing controller unit 301, a printer controller unit 302, a scanner controller unit 303, a printer 304, a scanner 305, and an operating unit 306.

The information processing controller unit 301 is a controller that unifies the control of the information processing related to the operations of the client device 120. The information processing controller unit 301 is connected to the printer controller unit 302, the scanner controller unit 303, and the operating unit 306. The operating unit 306 is configured by, for example, a touch panel that combines an input unit and a display unit.

The printer controller unit 302 is a controller that controls the printer 304. The printer 304 performs image forming on sheets fed by the paper feed cassette, which is not shown, using a known electrophotographic method based on the image data that has been input via the printer controller unit 302.

The scanner controller unit 303 is a controller that controls the scanner 305. The scanner 305 reads an original document that has been loaded onto it, and generates image data. The image data that has been generated by the scanner 305 is provided to printing using the printer 304, storage on an HDD 404, which is to be described below, or transmission to external devices via a network I/F 405, which is to be described below.

Figure 4:
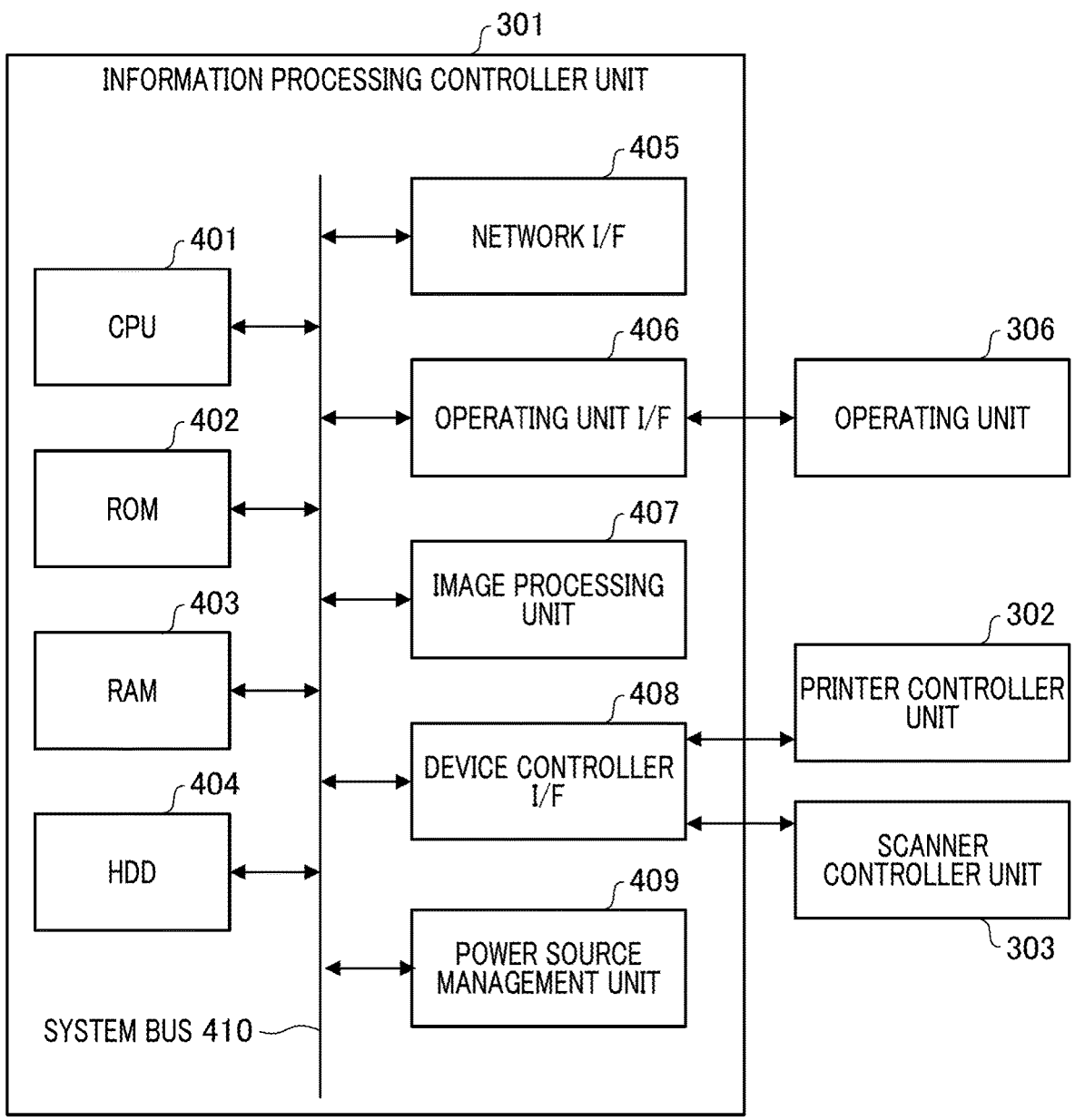
FIG. 4 is a diagram showing an example of a hardware configuration of an information processing controller unit.

FIG. 4 is a diagram showing an example of a hardware configuration of the information processing controller unit 301 of FIG. 3. The information processing controller unit 301 has a CPU 401, a ROM 402, a RAM 403, an HDD 404, a network I/F 405, an operating unit I/F 406, an image processing unit 407, a device controller I/F 408, and a power source management unit 409. Each element of the information processing controller unit 301 is connected to each other via a system bus 410.

The CPU 401 activates an OS using a boot program that is saved on the ROM 402. The CPU 401 executes each type of processing by executing an application program that is saved on the HDD 404 on the OS. The RAM 403 is used as the primary memory for the CPU 401, and a temporary area such as a working area or the like. Note that the HDD 404 saves the above-described application program, and data such as the settings, histories, and the like.

The network I/F 405 is an interface that performs communication with the network 150 conforming to specific communication protocols. The CPU 401 executes the reception and transmission of information between each device on the network 150 via the network I/F 405.

The operating unit I/F 406 is an interface that connects the CPU 401 and the operating unit 306. The operating unit I/F 406 sends information that has been input by the operating unit 306 to the CPU 401, along with outputting the image data to be displayed to the display panel of the display unit 306.

The image processing unit 407 executes image processing on the images output to the printer 304 and the images input from the scanner 305. The above-described image processing includes, for example, processing such as image rotation, image compression, resolution conversion, color space conversion, gradation conversion, and the like.

The device controller I/F 408 is connected to the printer controller unit 302 and the scanner controller unit 303. The device controller I/F 408 performs synchronous/asynchronous conversion of image data.

The power source management unit 409 executes power source control for the client devices overall. For example, in addition to controlling the on/off states of the power source, the power source management unit 409 performs control of the transition to the energy saving state, which is a state other than the regular power state, the return to the regular power state from the energy saving state, and the like.

Figure 5:
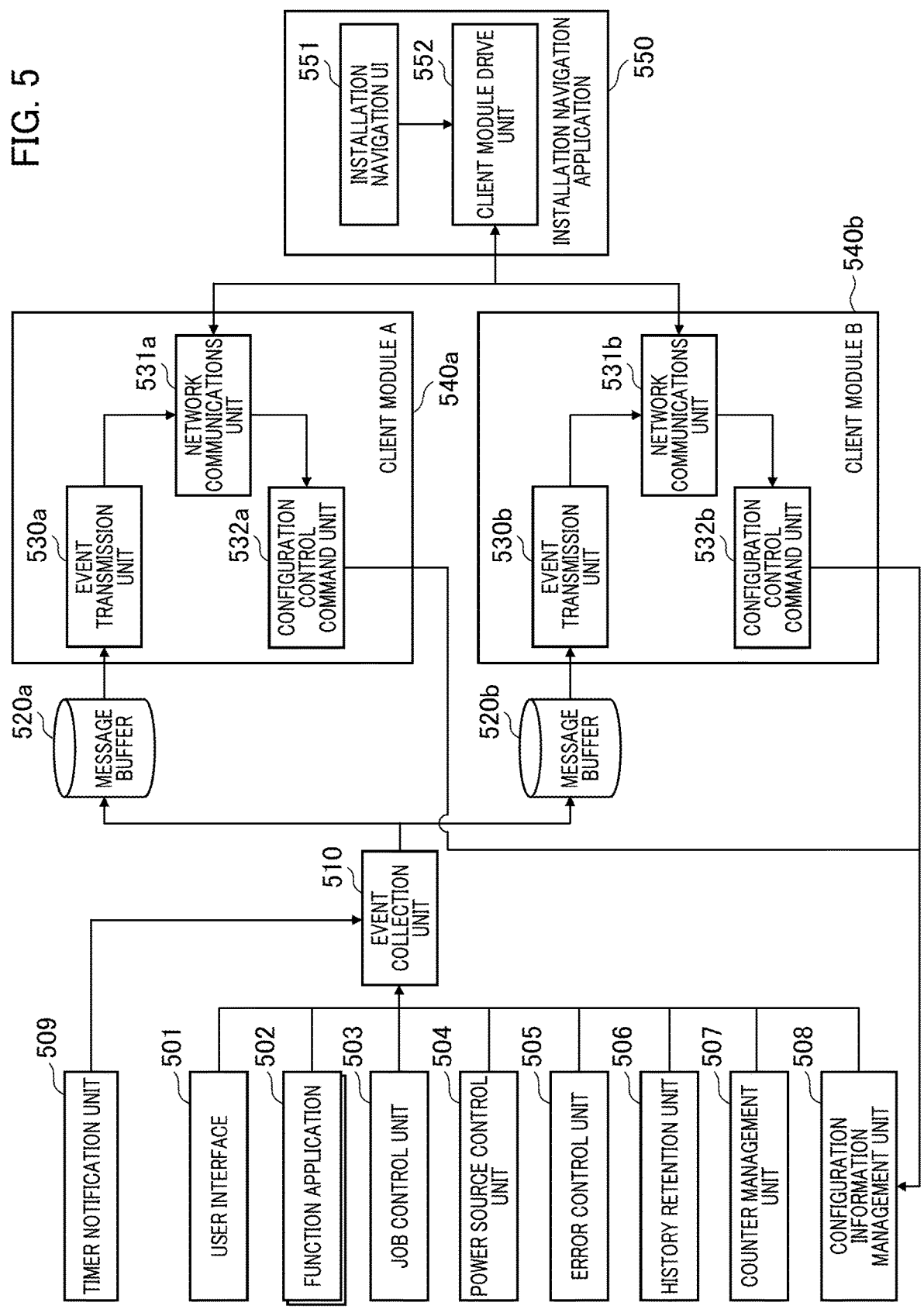
FIG. 5 is a diagram showing an example of a software configuration of an information processing controller unit.

FIG. 5 is a diagram showing an example of a software configuration of the information processing controller unit 301 in FIG. 3. The program for the software module that is shown in FIG. 5 is stored on one of the storage units of the RAM 403, the HDD 404, or the ROM 402, and is executed by the CPU 401. In addition, because the client device 120 of the present embodiment is a multifunction peripheral, a software that realizes the scan, print, and each type of function that uses a network and memory storage operates as the software module of FIG. 5.

The information processing controller unit 301 has a user interface 501, a function application 502, a job control unit 503, a power source control unit 504, an error control unit 505, a history retention unit 506, a counter management unit 507, and a configuration information management unit 508. In addition, the information processing controller unit 301 also has a timer notification unit 509, an event collection unit 510, a message buffer 520, a client module 540, and an installation navigation application 550.

In this context, one pair of message buffers 520 and client modules 540 is provided in the client device 120 per each cloud service of the management server 110. The present embodiment explains an example in which message buffers 520a and 520b, and a client module A 540a and a client module B 540b are provided in the client device 120. In addition, the message buffer 520a is a dedicated message buffer that corresponds to the client module A 540a, and the message buffer 520b is a dedicated message buffer that corresponds to the client module B 540b.

The user interface 501 is a software that handles the function of displaying the screen that the user operates on the operating unit 306, and the function of relaying the movements of the user operations to the software.

The function application 502 is an application program group corresponding to each type of function such as, for example, copying, printing, mail transmission, and the like. The client device 120 has a plurality of function applications 502 that corresponds to the number of functions. The function application 502 operates the application functions of the multifunction peripheral upon user instruction via the operation panel 306 or data reception via the network I/F 405, for example.

The job control unit 503 is a software that executes jobs by receiving commands from the function application 502. For example, when executing a print job, the job control unit 503 executes printing using the printer 304 by controlling the printer controller unit 302. In addition, for example, when executing a scan job, the job control unit 503 executes scanning using the scanner 305 by controlling the scanner controller unit 303.

The power source control unit 504 is, for example, a software that controls the power source management unit 409 in joint operation with the state of the software in the client device 120, and controls the transition between the regular power state and the energy saving state.

The error control unit 505 is a software that receives notifications about abnormal states that have occurred primarily in the job control unit 503, the printer controller unit 302, the scanner controller unit 303, or the like, and performs control of stopping the entire system, fallback operation commands, or the like.

The history retention unit 506 is a software that manages the history information in the client device 120, and handles the function of summarizing the user operations history, job execution results, error occurrences, and the like then saving these as histories. In addition, the history retention unit 506 also generates log information that is reserved for use in debugging analysis when a system problem occurs. The data that is generated by the history retention unit 506 is saved on the HDD 404, which a nonvolatile storage medium.

The counter management unit 507 is a software that manages each type of counter. For example, the counter management unit 507 manages the count of the number of scanned pages and the number of printed pages that have occurred in the client device 120, the count that measures the consumption amount for each type of consumable product such as the number of sheets of paper fed through the device, or the like. In addition, the counter management unit 507 may also manage the lifetime information for the products, which is calculated based on the above-mentioned consumption amount. The data that is managed by the counter management unit 507 is stored on the HDD 404, which is a nonvolatile storage medium.

The configuration information management unit 508 is a software for managing the hardware and software configurations that are included in the client device 120. For example, the configuration information management unit 508 manages the configurations of accessories that are externally attached to the client device 120 such as a paper input and output tray, a finisher, or the like, a list of firmware versions and installed applications, or the like. In addition, the configuration information management unit 508 also manages settings values that operate the information processing apparatus, and the like. Furthermore, the configuration information management unit 508 is also able to perform configurational controls such as firmware updates or like, and to execute control of application installation or the like, and settings updates, or the like.

The timer notification unit 509 generates timers in response to requests from the event collection unit 510, and handles the function of notifying the event collection unit 510 when a set amount of time has passed.

The event collection unit 510 monitors state transitions that have occurred in modules (501 to 506) that spontaneously issues events in the client device 120. In addition, the event collection unit 510 standardizes the event formats in order to transmit the monitoring results to the management server 110, and saves these on the message buffer 520. Note that the message buffer 520 is constructed on the HDD 404, and the standardized events are saved on the HDD 404, which is a nonvolatile storage medium.

In addition, the event collection unit 510 sends requests to the timer notification unit 509 to set off timers after the set period of time has passed. The event collection unit 510, which has received a notification from the timer notification unit 509, collects the periodically transmitted events using the timer set-off as a trigger. The counters and configuration information that are managed by the counter management unit 507 and the configuration information management unit 508, and the like can be given as examples of the events that are collected by the event collection unit 510. After acquisition, the event collection unit 510 standardizes the acquired information then saves it on the message buffer 520 in the same manner as the case in which it functions in an event driven manner.

Note that a generic format such as JSON or the like is used in the event standardization by the event collection unit 510. In addition to basic information such as the event name, time of occurrence, the serial number of the client device 120, or the like, the event collection unit 510 is also able to additionally assign various information based on the type of event. This assigned information is gathered by the event collection unit 510 from the state of each module (501 to 508) on the client device 120, the contents that have been saved in the nonvolatile area of the HDD 404, and the like.

The client module 540 handles the function of reading out the data that was collected by the event collection unit 510 and saved and on the corresponding message buffer 520, and transmitting this to the management server 110. One client module 540 exists per each connected management server 110, and in the case in which the device is connected to a plurality of management servers 110, a plurality of client modules 540 are also provided.

The configuration of the client module A 540*a* and the configuration of the client module B 540*b* that are shown in FIG. 5 are both the same. Each client module 540 has an event transmission unit 530, a network communications unit 531, and a configuration control command unit 532. The client module A 540*a* is one example of a first connection unit that performs connection to the cloud service A. The client module B 450*b* is one example of a second connection unit that performs connection to the cloud service B.

The event transmission unit 530 detects event occurrences by detecting writing to the dedicated message buffers 520 that have been provided for each client module 540, or the like. Upon detecting an event occurrence, the event transmission unit 530 reads out information from the dedicated message buffer 520, and transmits the event to the management server 110 via the network communications unit 531.

The network communications unit 531 is a software that controls communications with the management server 110 that corresponds to the client module 540 via the network I/F 405.

The configuration control command unit 532 is a software that receives commands from the management server 110 via the network communications unit 531, and executes each type of configuration control for the client device 120. For example, the configuration control command unit 532 receives commands from the management server 110 such as version upgrades for the firmware, application installation and uninstallation, changes to the settings values, and the like. In addition, the configuration control command unit 532 commands the configuration information management unit 508 to execute each type of configuration control according to the contents of the command from the management server 110. The configuration information management unit 508 is thereby able to apply the commands from the management server 110 to the client device 120.

The installation navigation application 550 is a software that handles the function of starting the operations of the client module 540, and has an installation navigation UI 551, and a client module drive unit 552. The installation navigation application 550 is one example of a connection support unit, and handles the function of supporting the initial connection to the cloud service B, which is performed after the connection to the client service A has been established.

The installation navigation UI 551 controls the activation of the client module 540. The client module drive unit 552 receives commands from the installation navigation UI 551 and sends an activation command to the necessary client module 540. Note that the client module 540 that receives the activation command from the client module drive unit 552, executes the initial connection to the management server 110 using the network communications unit 531 (initial connection processing). Thereby, use of cloud services that are provided by the management server 110 is thereby started on the client device 120.

Figure 6:
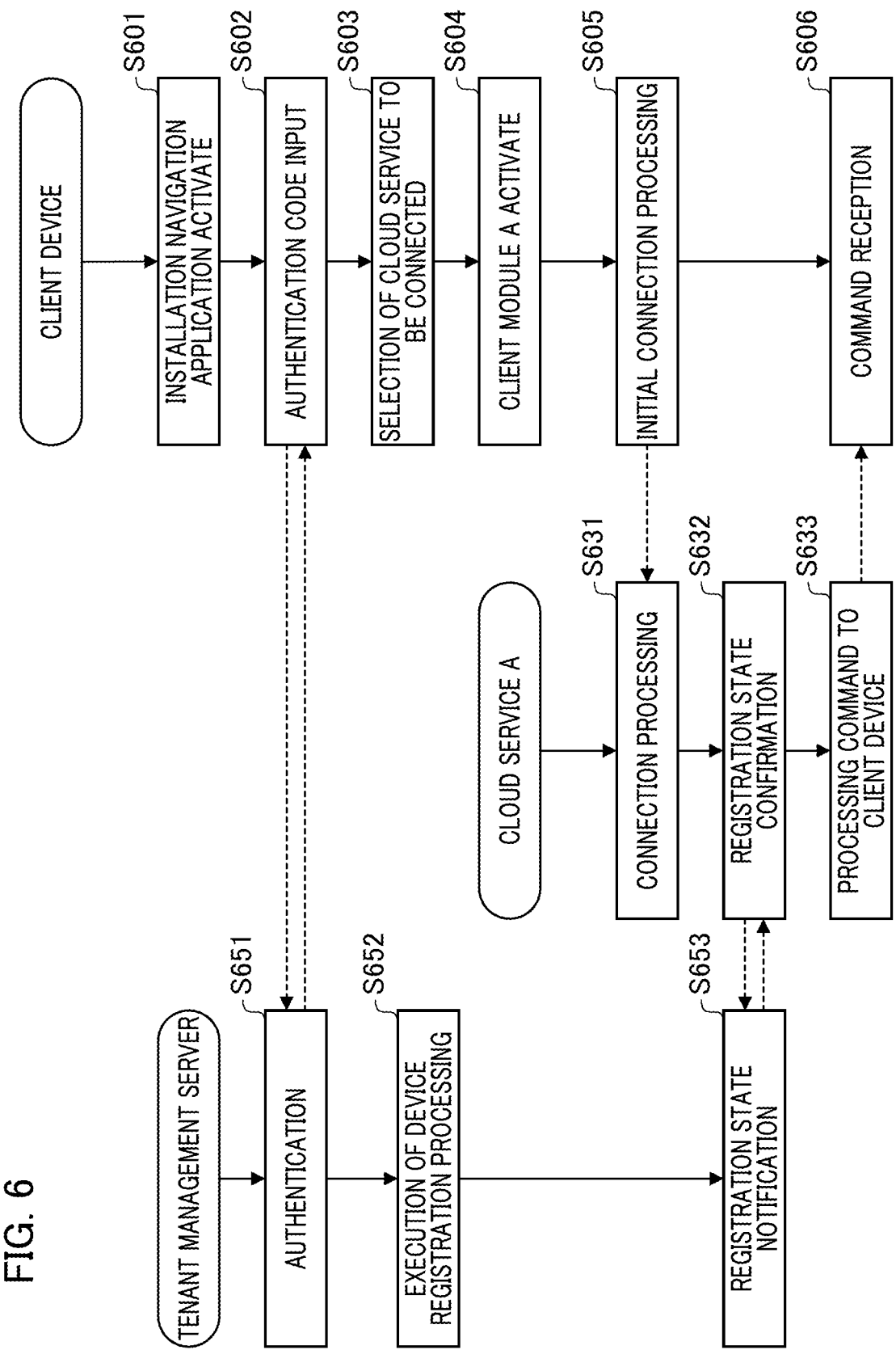
FIG. 6 is a diagram showing an example of operations for when a client device connects to a management service that provides a first cloud service for the first time.

FIG. 6 is a diagram showing an example of the operations for when the client device 120 connects to the management server 110*a* that provides the first cloud service for the first time. In FIGS. 6, S601 to S606 are operations on the client device 120. S631 to S633 are operations of the cloud service A operating on the management server 110*a*. S651 to S653 are operations on the tenant management server 115. Note that the cloud service A is one example of a first cloud service.

In this context, the program that realizes the operations of the client device 120 is stored on any of the RAM 403, the HDD 404, or the ROM 402, and is executed by the CPU 401. In the same manner, the program that realizes the operations of the management server 110 is stored on any of the RAM 203, the HDD 204, or the ROM 202 of the management server 110, and is executed by the CPU 201 of the management server 110. In addition, the program that realizes the operations of the tenant management server 115 is stored on any of the RAM 203, the HDD 204, or the ROM 202 of the tenant management server 115, and is executed by the CPU 201 of the tenant management server 115. The operation subjects of these programs are also the same in the following explanation.

Firstly, the client device 120 activates the installation navigation application 550 in response to a user command (S601). Thereby, an input screen is displayed on the operating unit 306 of the client device 120 due to the control of the installation navigation UI 551.

The installation navigation UI 551 receives a user input regarding the authentication information that is necessary to connect to the cloud service from the above-described input screen (S602). Upon receiving the input of the above-described authentication information, the client device 120 transmits the authentication information to the tenant management server 115.

Upon receiving the authentication information from the client device 120, the tenant management server 115 executes authentication processing based on the authentication information (S651). If the authentication processing succeeds, the tenant management server 115 returns an access token to the client device 120 to serve as the authentication result. Subsequently, registration processing for the client device 120 is executed on the tenant management server 115, and the serial number, device information, and the like of the client device 120 are registered on the cloud service (S652). The above-described registration processing is managed by associating customer information relating to the owner of the client device 120 (the customer), and contract information that shows the contents of the contract with this customer with information that uniquely specifies the client device 120 (for example an ID). It is thereby possible to specify the cloud services that the client device 120 is able to use on the tenant management server 115.

In contrast, after authentication, the client device 120 receives the selection input for the cloud service A to serve as the cloud service connection target (S603). Thereupon, the client module drive unit 552 of the installation navigation application 550 activates the client module A 540a (S604).

In this context, upon installation, by being activated by the installation navigation application 550, each client module 540 registers the local name, the name of the corresponding cloud service, and the like, to the installation navigation application 550. In addition, the client module 540 executes processing to register a callback API that receives commands in the installation navigation application 550. The installation navigation application 550 is thereby able to identify the plurality of client modules 540 that have been registered and the corresponding cloud services, and it is also able to transmit and control commands relating to these.

Subsequently, the client module A 540a executes initial connection processing to the cloud service A (S605). During the initial connection processing in S605, an ID that identifies at least the seller or the customer is necessary, and the client module A 540a transmits an initial connection request that includes the above-described ID to the cloud service A.

The cloud service A on the management server 110a receives the initial connection request and executes connection processing for the client device 120 (S631). Thereupon, the cloud service A transmits a confirmation request for the registration state to the tenant management server 115, and executes processing to confirm the registration state of the client device 120 (S632).

In contrast, upon receiving a registration state confirmation request, the tenant management server 115 references the information of the registration contents that are recorded on the tenant management server 115. In this context, the information such as the serial number that is the identifier for the client device, and the list of the cloud services that are usable based on the contents of the contract are associated and stored on the tenant management server 115 to serve as the information for the registration contents. In addition, the tenant management server 115 determines if the client device 120 is in a registration state in which it can start the cloud service A based on the contract with the customer (S652). In addition, the tenant server management server 115 notifies the cloud service A about the registration state confirmation results for the client device 120 (S653).

In addition, upon receiving the notification of the registration state confirmation results, the cloud service A determines if it is possible to start the service on the client device 120 based on the above-described notification. In the case in which it is possible to start the service on the client device 120, the cloud service A starts communications with the client device 120, and transmits a command for processing for the reception of data that depends on the service to be started, or the like to the client device 120 (S633).

Upon receiving the command for processing from the cloud service A, the client device 120 starts the necessary communications with the management server 110a (S606). The connection between the cloud service A and the client device 120 is established in the above-described manner.

Figure 7:
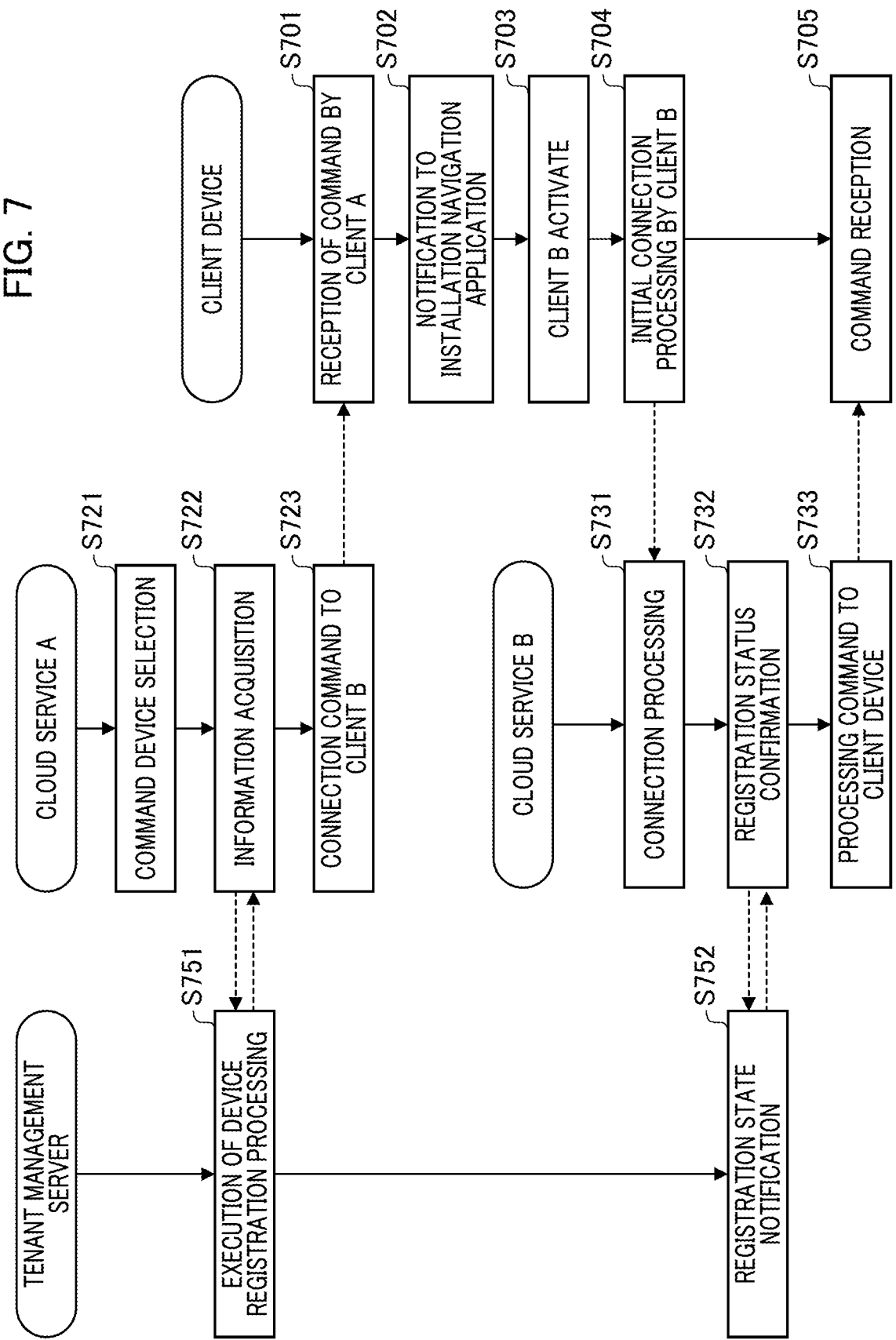
FIG. 7 is a diagram showing an example of operations for when connection to a new cloud service is performed after the processing in FIG. 6.

FIG. 7 is a diagram showing an example of the operations for when connection to a new cloud service is performed after the processing in FIG. 6. In FIGS. 7, S701 to S705 are operations at the client device 120. S721 to S723 are operations of the cloud service A operating on the management server 110a. S731 to S733 are operations of the cloud service B operating on the management server 110b. S751 to S752 are operations on the tenant management server 115. Note that the cloud service B is one example of a second cloud service.

Firstly, the management server 110a, which is operated by the cloud service A, receives a user input via a user interface (UI), which will be described below. It is assumed that the user performs the selection (designation) of the client device 120 that operates the cloud service B on this UI (S721). Thereupon, the management server 110a executes processing on the tenant management server 115 to acquire the information for the client device 120 that was designated on the UI (S722).

In contrast, the tenant management server 115 uses the information acquisition processing of the management server 110a as a trigger and references the information from the registration contents that are recorded on the tenant management server 115. In addition, the tenant management server 115 determines if the client device 120 is in a registration state in which it can start the cloud service B based on the contract with the customer (S751). In the case in which the tenant management server 115 can start the service on the client device 120, the tenant management server 115 returns the access token and the registration state confirmation results for the client device 120 to the cloud service A.

Subsequently, the cloud service A transmits the access token and the settings information that is necessary for connection, and an activation command for the client module B 540b to the client device 120 (S723).

The client module A 540a of the client device 120 receives the above-described activation command (S701). Thereupon, the client module A 540a notifies the installation navigation application 550 about the received contents in order to activate the client module B 540*b* (S702). Subsequently, the client module drive unit 552 activates the client module B 540*b* (S703).

Subsequently, the client module B 540 executes initial connection processing for the cloud service B (S704). During the initial connection processing in S704, the client module B 540*b* receives all of the necessary parameters for the activation such as the access token, the settings information, and the like, via the management server 110*a*. Due to this, it is possible for the client module B 540*b* to automatically start the connection processing, and to transmit the initial connection request to the cloud service B, which eliminates the user input procedures (authentication input, each type of settings input, and the like) from the client device 120.

The cloud service B on the management server 110*b* receives the initial processing request and executes connection processing with the client device 120 (S731). Thereupon, the cloud service B transmits a registration state confirmation request to the tenant management server 115, and executes processing to confirm the registration state of the client device 120 (S732).

Upon receiving the registration state confirmation request, the tenant management server 115 references the information of the registration contents that are recorded on the tenant management server 115. In addition, the tenant management server 115 determines if the client device 120 is in a registration state in which it can start the cloud service B based on the contract with the customer. In addition, the tenant management server 115 notifies the cloud service B about the registration state conformation results for the client device 120 (S752).

In addition, upon receiving the notification of the registration state confirmation results, the cloud service B determines if the service can be started on the client device 120 based on the above-described notification. In the case in which the service can be started on the client device 120, the cloud service B starts communications with the client device 120, and transmits commands for processing such as the reception of the data that is dependent on the service to be started to the client device 120 (S733).

Upon receiving the processing commands from the cloud service B, the client device 120 starts the necessary communications with the management server 110*b* (S705). The connection between the cloud service B and the client device 120 is established in the above-described manner.

Figure 8:
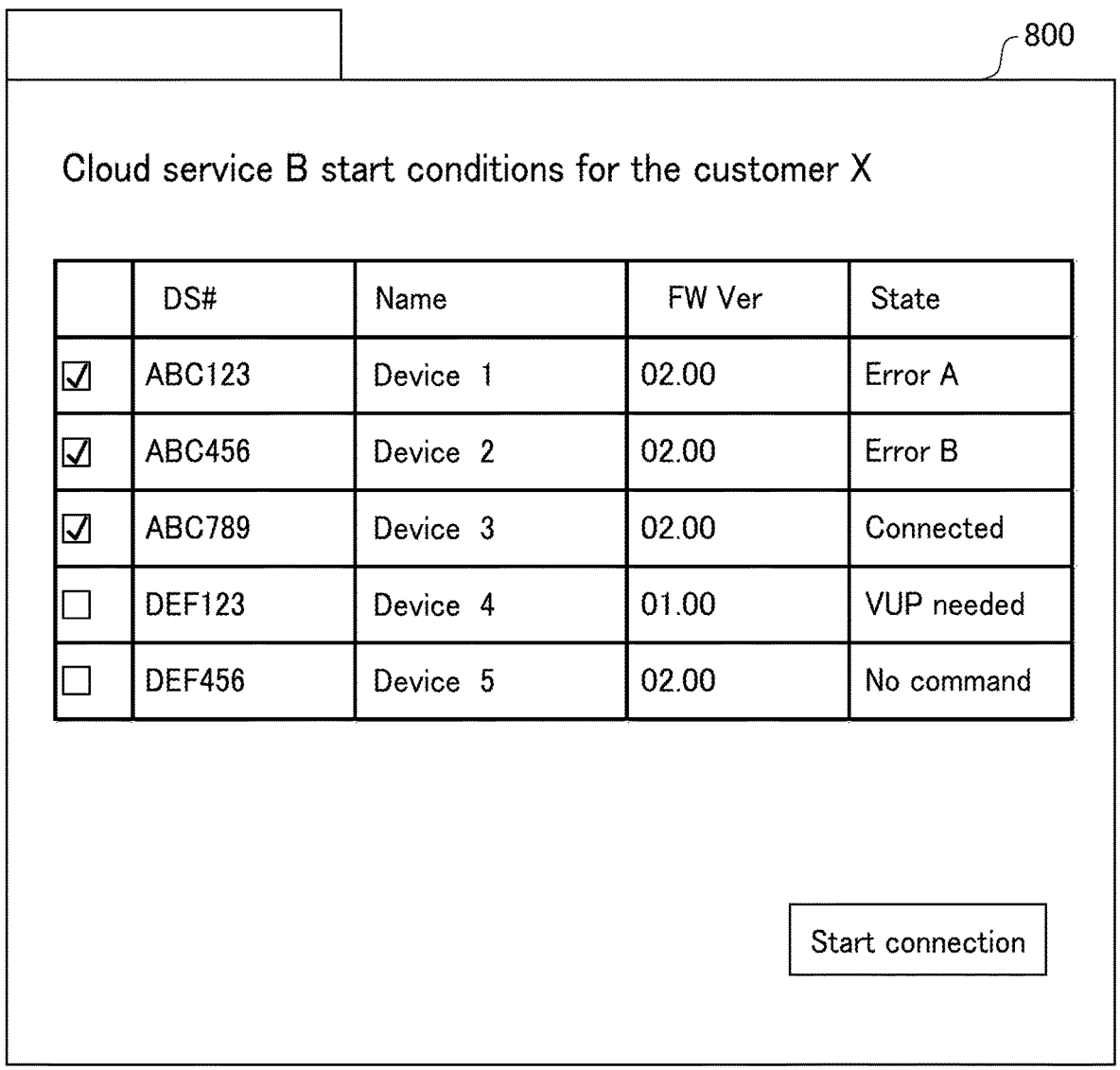
FIG. 8 is a diagram showing an example of a screen display of a UI that is controlled by a management server.

FIG. 8 is a diagram showing an example of a screen display for a UI that is controlled by the cloud service A. The above-described UI is used when, for example, an input from the user to start the operations of the cloud service B is received on the cloud service A in S721 in FIG. 7. Note that the module related to the control of the UI that functions on the management server 110*a* functions as one example of a management unit that manages the connection of the client device 120 and the cloud service B.

The UI screen in FIG. 8 may also be displayed on, for example, the display unit 210 of the management server 110*a*. Alternatively, in the case in which input and output to/from the management server 110*a* are possible using a web-based application, this UI may be provided via a web browser and displayed on the display unit.

The screen 800 of the UI that is shown in FIG. 8 can remotely command the client device 120, which is associated with a specific customer X, to start the cloud service B using the communications of the cloud service A. The screen 800 displays the information that shows the start conditions of the cloud service B for each device (client device 120) corresponding to the customer X based on the information from the registration contents on the tenant management server 115.

Each item such as the serial number, name, firmware version (FW ver), and state of the cloud service B are associated with each client device and displayed row by row on the screen 800. In FIG. 8, an example is shown in which 5 rows of information for the client device 120 corresponding to the customer X are displayed on the screen 800. The serial number and name are one example of information that identifies the client device 120.

In this context, the firmware version information is referenced when determining if it is possible to start the connection processing with the client device 120. In addition, one of "no command", "VUP needed", "error A", "error B", and "connected" is displayed in the state items on the screen 800 as the connection state with the cloud service A. Below, the state display of the screen 800 will be explained with reference to FIG. 9.

Figure 9:
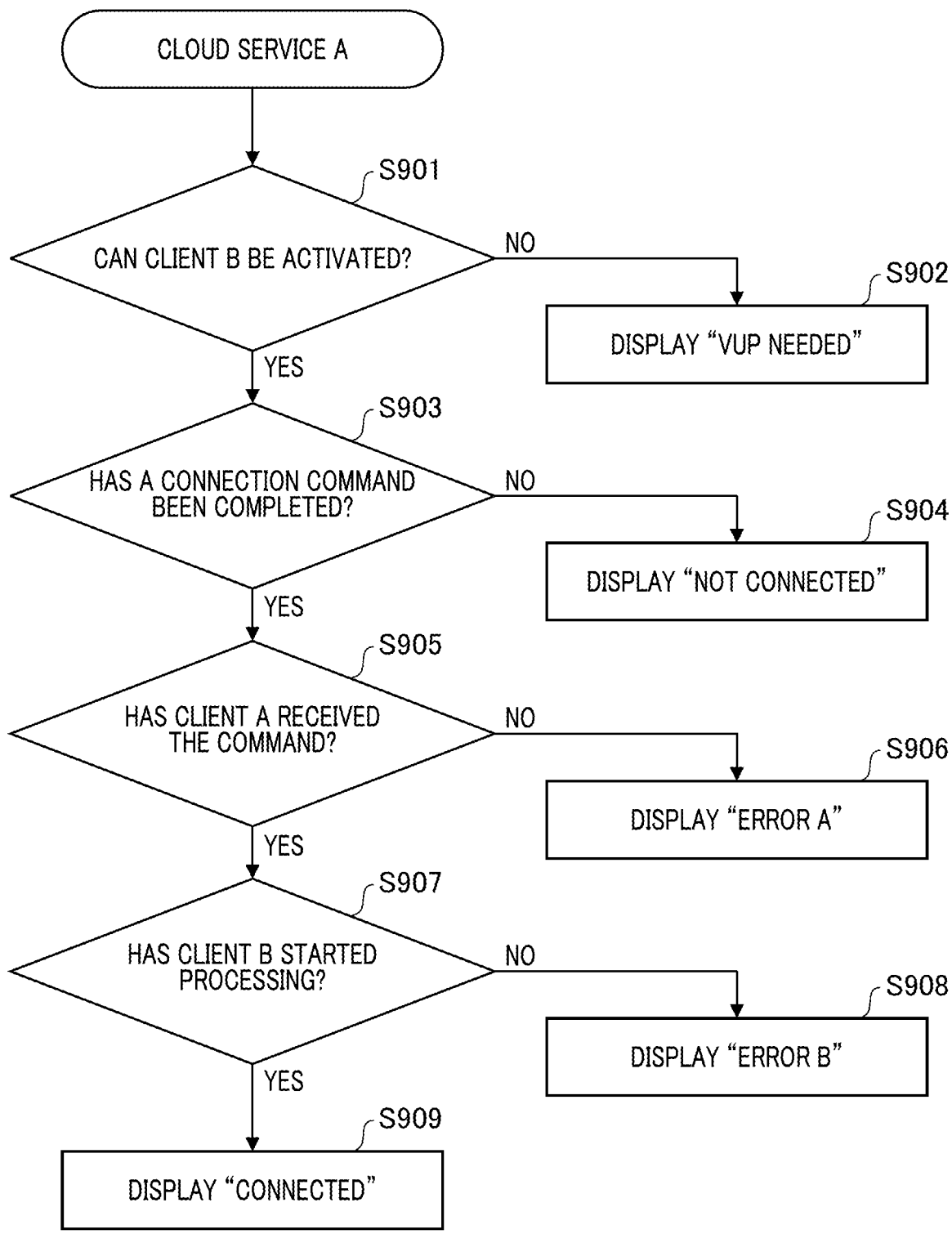
FIG. 9 is a diagram showing an example of processing for a state display on the screen of a UI by the control of a management server.

FIG. 9 is a diagram showing an example of processing for a state display on the screen 800 of the UI under the control of the cloud service A. Note that the processing in FIG. 9 is executed with each of the client devices 120 corresponding to the customer X serving as the processing targets.

Firstly, in S901, when the screen 800 of the UI is displayed, the cloud service A acquires the information for the registration contents from the tenant management server 115. In addition, the cloud service A determines if the client device 120, which is the processing target, can activate the client B. For example, the management server 110*a* determines if the firmware version of the processing target is a version that includes the functions of the client module 540*b*.

In S901, in the case in which the client B can be activated, the processing transitions to S903. In contrast, in the case in which the client B cannot be activated, the processing transitions to S902.

In S902, the cloud service A displays "VUP needed", which shows that the firmware version needs to be updated, in the state item for the processing target on the screen 800 of the UI. In this case, the cloud service A performs control to make the "VUP needed" client device 120 un-selectable when performing the command to start the cloud service B from the screen 800 of the UI.

In S903, the cloud service A determines if the user has made a connection command to the client device 120 that is the processing target (has the execution of S723 been completed). In the case in which the user has made a connection command, the processing transitions to S905. In contrast, in the case in which the user has not completed a connection command, the processing transitions to S904.

In S904, the cloud service A displays "not connected", which shows that a connection command for the client B has not been carried out on the client device 120 that is the processing target, in the state item for the processing target on the screen 800 of the UI.

In S905, the cloud service A determines if the client module A 540*a* has received a command. The reception determination can be performed using, for example, the presence or absence of a reception notification from the client module A 540*a*. In the case in which the client module A 540*a* has received a command, the processing transitions to S907. In contrast, in the case in which the client module A 540*a* has not received a command, the processing transitions to S906.

In S906, the cloud service A displays "error A", which shows that the client module A 540*a* has not received a command, in the state item for the processing target on the screen 800 of the UI. The error A is one example of a first error. The "error A" message makes it possible to prompt the user to confirm if the client device 120 is operating normally, and to confirm if the communications state of the client module A 540*a* is normal.

In S907, the cloud service A determines if the client module B 540*b* has started the processing. The processing start determination can be performed by, for example, the reception of a processing start notification from the client module B 540*a* via the client module A 540*a*. In the case in which the client module B 540*b* has started the processing, the processing transitions to S909. In contrast, in the case in which the client module B 540*b* has not started the processing, the processing transitions to S908.

In S908, the cloud service A displays "error B", which shows that a connection to the client module B 540*b* has not been established, and the client module B 540*b* is not operating, in the state item for the processing target on the screen 800 of the UI. The error B is one example of a second error. The "error B" message makes it is possible to prompt the user to confirm if the communications state of the client module B 540*b* is normal.

In S909, the cloud service A displays "connected", which shows that the client module B 540*b* is operating, in the state item for the processing target on the screen 800 of the UI. This concludes the explanation of the First Embodiment.

In the First Embodiment, the client module A 540*a* receives settings information including an access token, and a command to start the connection to the cloud service B from the cloud service A, which is already connected (S701). The installation navigation application 550 activates the client module B 540*b* in response to a command from the cloud service A via the client module A 540*a* (S702, S703). In addition, the client module B 540*b* executes the initial connection processing on the cloud service B without receiving an authentication input from the client device 120 (S704).

In the First Embodiment, when the client device 120 connects to the cloud service B, it performs transmission of a command, and the settings information to the client module A 540*a* by using the communications path of the cloud service A, to which a connection has already been established. The client module B 540*b* executes the initial connection processing in response to the command from the cloud service A, eliminating the authentication input, and the like by using the received settings information. Therefore, according to the First Embodiment, it is possible to improve the efficiency when connecting the client device 120 to a plurality of cloud services.

Second Embodiment

Next, a Second Embodiment will be explained. Note that in the explanation of each of the following embodiments, the same reference numbers will be used for the elements that are the same as those of the First Embodiment, and all redundant explanations will be omitted.

In the First Embodiment, when the client device 120 uses a plurality of cloud services at the same time, a command on the communication path to a cloud service that is already connected is used, and a communication path with a new cloud service is established. In relation to this, the Second Embodiment is in a state in which a transition is made from the prior cloud service A to the new cloud service B. During the transition to the new cloud service B, the use of the prior cloud service A is stopped after the connection to the cloud service B is established. In the Second Embodiment, excluding the point that the operations of the client device 120 in FIG. 7 (S701 to S705) are replaced with those in FIG. 10, the configurations and basic operations of each apparatus are the same as those in the First Embodiment.

Figure 10:
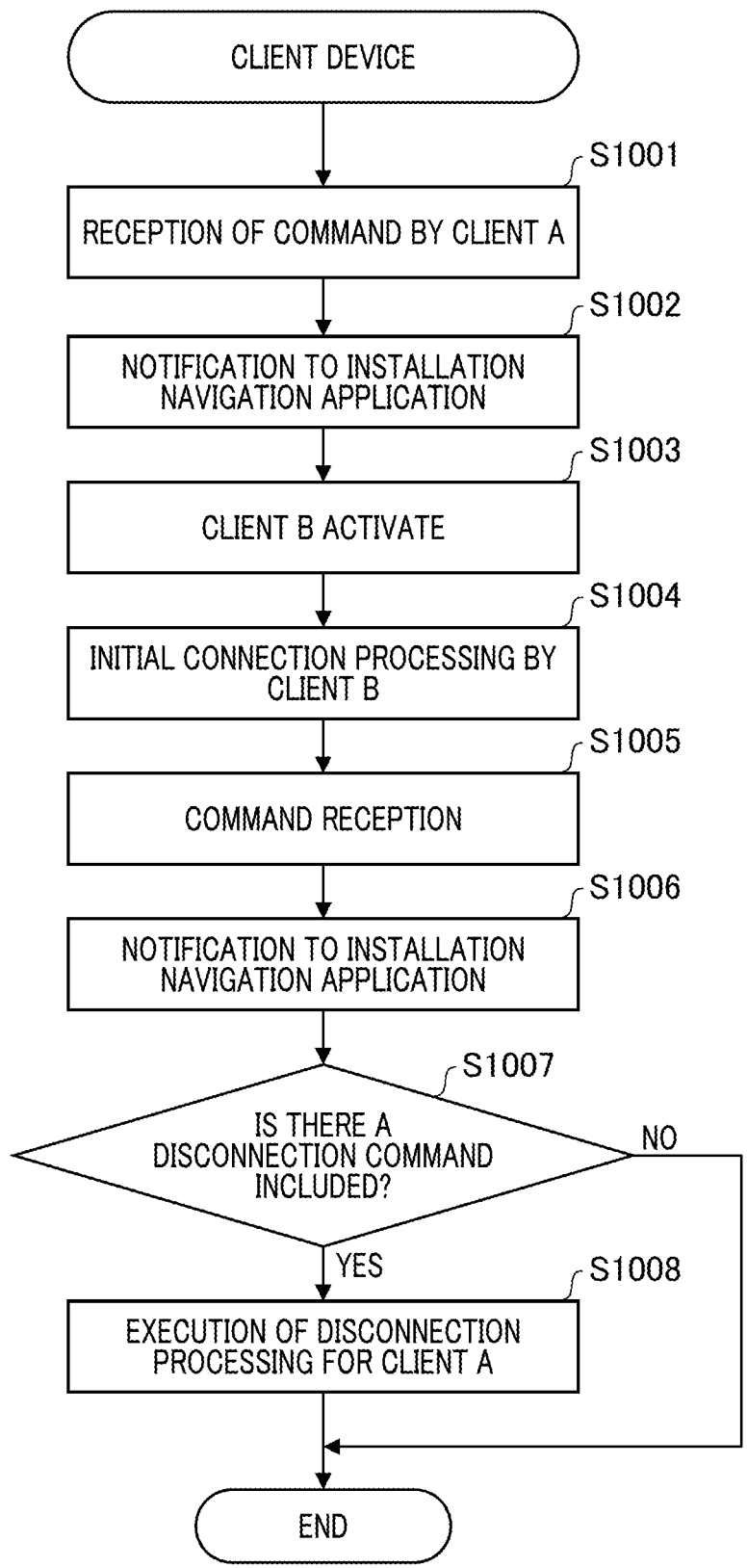
FIG. 10 is a diagram showing an example of operations for a client device when connection to a new cloud service is performed in a Second Embodiment.

FIG. 10 is a diagram showing an example of the operations of the client device 120 when connection to a new cloud service is performed in the Second Embodiment. The processing of S1001 to S1005 in FIG. 10 are the same as the processing for S701 to S705 in FIG. 7, respectively. In the case of FIG. 10, the processing for S1006 and after are further executed after S1005. Note that in the step of S1005, the client device 120 is in a state in which the communications operations of the client module B 540*b* can be started by using the communication path for the client module A 540*a*.

In S1006, in the client device 120, the installation navigation application 550 is notified that the client module B 540 has started operating.

In S1007, the instillation navigation application 550 determines if the contents of the command that was received in S1001 include an order to stop the use of the cloud service A (disconnection command). In the case in which a disconnection command for the cloud service A is not included, the client device 120 ends the processing in FIG. 10. In the case in which a disconnection command for the cloud service A is included, the processing transitions to S1008.

In S1008, the instillation navigation application 550 performs a command to the client module A 540*a* to cut the connection with the cloud service A. Due to this, the client module A 540*a* cut the connection to the cloud service A, and subsequent use of the cloud service A is stopped. This concludes the explanation of FIG. 10.

According to the Second Embodiment, in addition to achieving the same effects as the First Embodiment, it is also possible to stop the use of the cloud service A in accordance with a transition to the cloud service B without performing any operations on the client device 120.

Third Embodiment

Next, a Third Embodiment will be explained.

In the First Embodiment and the Second Embodiment, a state is assumed in which the client module B 540*b* has already been installed on the client device 120. In these Embodiments, in the case in which the client module B cannot be activated during the preliminary confirmation stage, it is displayed that the firmware version needs to be updated, and control is performed that makes an automatic connection command for the client module B impossible.

However, as will be shown in the following Third Embodiment, the client module B 540 may be in a state in which it is automatically added by an additional installation. For example, the separate installation of the client module B 540*b* may be executed when the activation command is received. In the Third Embodiment, excluding the point that the operations of the client device 120 in FIG. 7 (S701 to S705) will be replaced with those in FIG. 11, the configurations and basic operations of each device are the same as those in the First Embodiment.

Figure 11:
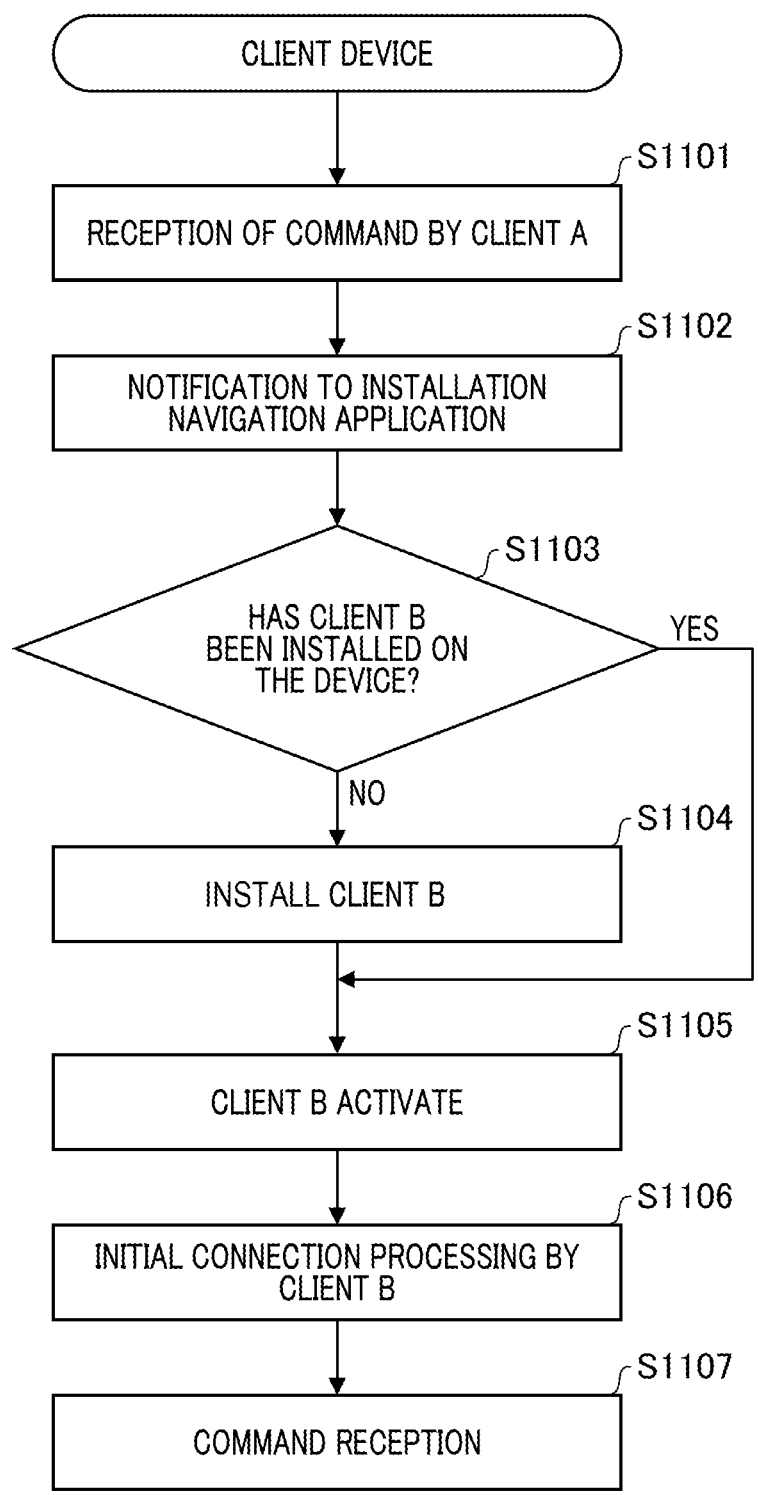
FIG. 11 is a diagram showing an example of operations for a client device that has received an activation command from a client module B in a Third Embodiment.

FIG. 11 is a diagram showing an example of an operation of the client device 120 after having received an activation command for the client module B 540*b* in the Third Embodiment. The processing of S1101 and S1102 in FIG. 11 are both the same as the processing of S701 and S702 in FIG. 7. In the case of FIG. 11, processing after S1103 is further executed after S1102.

In S1103, the installation navigation application 550 determines if the client module B 540*b* has been installed on the client device 120. In the case in which the client module B has been installed, the processing transitions to S1105. In contrast, in the case in which the client module B has not been installed, the processing transitions to S1104.

In S1104, the client device 120 executes the installation of the client module B 540*b*. The processing in S1104 is realized by, for example, updating the firmware version, additionally installing the client module B, or the like. Specifically, the installation navigation application 550 downloads the necessary software from an external source due to a command to the configuration control command unit 532*a*, which is included in the client module A. In addition, the installation of the client module B 540*b* is executed by the configuration information management unit 508. Subsequently, the processing transitions to S1105.

The processing of S1105 to S1107 in FIG. 11 is the same as the processing for each of S703 to S705 in FIG. 7 respectively. This concludes the explanation of FIG. 11.

According to the Third Embodiment, in addition to achieving the same effects as the First Embodiment, it is also possible to start the use of the cloud service B by remote control by performing an automatic installation, even in the case in which the client module B 540*b* does not exist on the client device 120.

Preferred embodiments of the present invention have been explained above. However, the present invention is not limited by these embodiments, and various modifications or alterations can be made within the scope of the summary thereof.

In each of the above-described embodiments, the case of an image processing apparatus (a multifunction peripheral) has been explained as one example of an information processing apparatus that is able to use a plurality of cloud services. However, the present invention is not limited to image processing apparatuses, and may also be widely applied to any network device that can use a plurality of cloud services.

In addition, the present invention can also be applied between a plurality of independent cloud services without sharing the client management. In this case, it is necessary that the client module 540 has functions for transferring the necessary settings information and commands to the client module drive unit 552, and a function to start up based on a command from the client module drive unit 552.

The present invention can also be realized using processing in which a program that realizes the functions of one or more of the Embodiments is supplied to a system or a device via a network or a storage medium, and one or more of the processors in the computer of this device or system performs a read out of this program. In addition, the present invention can also be realized by a circuit (for example, an ASIC), that realizes one or more function.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2021-139105, filed Aug. 27, 2021 which is hereby incorporated by reference wherein in its entirety.

What is claimed is:

1. An information processing apparatus able to use a plurality of cloud services provided by different cloud service systems on a network, the information processing apparatus comprising:
   a memory storing instructions; and
   a processor executing the instructions causing the information processing apparatus to:
      transmit authentication information to a tenant management server to register the information processing apparatus with a first cloud service and receive an access token from the tenant management server after authentication processing is performed on the tenant management server and the information processing apparatus is registered with the first cloud service;
      perform connection to the first cloud service, serving as a first connection processing; perform connection to a second cloud service differing from the first cloud service, serving as a second connection processing; and
      support an initial connection to the second cloud service, which is performed after the connection to the first cloud service has been established, serving as a connection support processing,
   wherein:
      during the first connection processing, before the initial connection to the second cloud service, settings information including the access token, and a command to start the connection to the second cloud service is received from the tenant management server via the first cloud service, which is already connected, and a command to start the connection to the second cloud service is received from the first cloud service,
      during the connection support processing, the second connection processing is activated in response to the command from the first cloud service via the first connection processing,
      during the second connection processing, the initial connection to the second cloud service is executed in response to the command received from the first cloud service using the settings information including the access token without receiving an authentication input,
   wherein the command includes an order to stop use of the first cloud service, and
   wherein, during the connection support processing, in a case where the order is included in the command, connection to the first cloud service is stopped after a connection to the second cloud service has been established by the second connection processing; and
   wherein, during the connection support processing, the information processing apparatus installs software for the second connection processing by obtaining the software from an external source.

2. A method for an information processing system including a first cloud service and a second cloud service provided by different cloud service systems on a network, and an information processing apparatus, which is able to use the first cloud service and the second cloud service,
   wherein the information processing apparatus comprises:
      an authentication unit configured to transmit authentication information to a tenant management server to register the information processing apparatus with the first cloud service and receive an access token from the tenant management server after authentication processing is performed on the tenant management server and the information processing apparatus is registered with the first cloud service;
a first connection unit configured to perform connection to the first cloud service;
a second connection unit configured to perform connection to the second cloud service; and
a connection support unit configured to support an initial connection to the second cloud service, which is performed after the connection to the first cloud service has been established, and
wherein the method comprises:
transmitting settings information including the access token from the tenant management server via the first cloud service, which is already connected, to the information processing apparatus, and transmitting a command from the first cloud service to start the connection to the second cloud service;
the first connection unit receiving the command from the first cloud service;
the connection support unit activating the second connection unit in response to the command from the first cloud service via the first connection unit;
the second connection unit executing the initial connection to the second cloud service in response to the command received from the first cloud service using the settings information including the access token without receiving an authentication input,
wherein the command includes an order to stop use of the first cloud service, and
wherein, during the connection support processing, in a case where the order is included in the command, connection to the first cloud service is stopped after a connection to the second cloud service has been established by the second connection processing; and
wherein, during the connection support processing, the information processing apparatus installs software for the second connection processing by obtaining the software from an external source.

3. The method according to claim 2, wherein the first cloud service has a management unit configured to manage the connection of the information processing apparatus to the second cloud service, and wherein the management unit receives the designation of the information processing apparatus to be connected to the second cloud service from a user.

4. The method according to claim 3, wherein the management unit associates and displays, on a display device, information identifying the information processing apparatus and information showing a connection state to the second cloud service.

5. The method according to claim 4, wherein, in a case where the first connection unit has not received the command after the command has been transmitted, the management unit performs control to display a first error to serve as information showing the connection state.

6. The method according to claim 4, wherein, in a case where the connection between the second connection unit and the second cloud service has not been established after the command has been transmitted, the management unit performs control to display a second error to serve as information that shows the connection state.

* * * * *